(12) United States Patent
Simmel et al.

(10) Patent No.: US 6,220,882 B1
(45) Date of Patent: Apr. 24, 2001

(54) IC CARD CONNECTOR WITH RELEASE MEANS

(75) Inventors: George M. Simmel; Yew Teck Yap, both of Naperville; Malgorzata M. Firlej, Wheaton, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/440,793

(22) Filed: Nov. 15, 1999

(51) Int. Cl.[7] ................................................. H01R 13/62
(52) U.S. Cl. ............................................. 439/326; 439/940
(58) Field of Search .................................... 439/326, 331, 439/940

(56) References Cited

U.S. PATENT DOCUMENTS

| | | | |
|---|---|---|---|
| 5,226,826 | 7/1993 | Nillson et al. | 439/72 |
| 5,320,552 | 6/1994 | Reichardt et al. | 439/331 |
| 5,603,629 | 2/1997 | DeFrasne et al. | 439/331 |
| 5,813,878 | 9/1998 | Kuwata et al. | 439/326 |

*Primary Examiner*—Tulsidas Patel
*Assistant Examiner*—Javaid Nasri
(74) *Attorney, Agent, or Firm*—Stacey E. Caldwell

(57) ABSTRACT

An IC connector is adapted for connecting an IC card having a terminal array. The connector includes a base member having a plurality of electrically conductive contacts for engaging the terminal array of the IC card. A cover is mounted on the base member for pivotal movement toward and away from one side of the base member. The cover has a receptacle means for securing the IC card thereon. The IC card is received for sliding movement relative to the cover between a preload position and a latched position. A biasing shoulder on the base member slides the IC card from its preload position to its latched position in response to closing of the cover. A latch on the base member engages the IC card in its latched position to lock the cover and IC card in a closed position on the base member. A release on the base member moves the biasing shoulder out of engagement with the IC card to allow the IC card to be moved back to its preload position out of engagement with the latch, whereby the cover and IC card can be pivoted back to an open position.

24 Claims, 11 Drawing Sheets

IC CARD CONNECTOR WITH RELEASE MEANS

FIELD OF THE INVENTION

This invention generally relates to the art of electrical connectors and, particularly, to an improved IC card connector for connecting an IC card, such as a SIM card, in an IC card reader system such as a cellular phone or the like.

BACKGROUND OF THE INVENTION

IC cards have been developed and contain IC's (integrated circuits) including memory circuits, such as rams (random access memories), and controls circuits, such as CPUs (central processing units). A special type of IC card, called a SIM card (subscriber identification module card) is of increasing interest and is used in cellular phones as an identification and storage unit for subscriber related data. SIM cards normally include a terminal array for connection through a card reader system to the external equipment. The connector usually includes some form of IC card socket and a plurality of electrodes or contacts exposed in the socket for engaging the terminal array of the IC card. The card is inserted into and removed from the socket, and the connector contacts are resilient or comprise springy contacts for yieldably engaging the terminal array of the card when the card is inserted into the socket.

With the ever-increasing miniaturization of IC cards and their respective connectors, various problems continue to arise. For instance, the very handling of the miniature IC cards is difficult, and proper positioning of the cards in the connector presents corresponding problems when the card is inserted into and removed from the card-receiving cavity or other receptacle means of the connector. Such card connectors may have locking means for holding the IC card in a locked reading position, but such locking means often have reliability problems. Still further, it often is very difficult to grip and remove the inserted chip card from the connector. This invention is directed to solving these various problems in a miniature SIM card connector which is reliable and simple to manufacture and assemble.

SUMMARY OF THE INVENTION

An object, therefore, of the invention is to provide a new and improved IC card connector for connecting an IC card having a terminal array, in an IC card reader system or the like.

In the exemplary embodiment of the invention, the connector includes a base member having a plurality of electrically conductive contacts exposed at least on one side thereof for engaging the terminal array of the IC card. A cover is mounted on the base member for pivotal movement about an axis of rotation toward and away from one side of the base member. The cover includes receptacle means for securing the IC card thereon, whereby closing of the cover onto the base member effects engagement of the IC card terminal array with the contacts on the base member. The IC card is received for sliding movement relative to the cover in a direction generally perpendicular to the axis of rotation between a preload position and a latched position.

The invention contemplates the provision of biasing means on the base member for sliding the IC card from its preload position to its latched position automatically in response to closing the cover. Latch means on the base member engage the IC card in its latched position to lock the cover and IC card in a closed position on the base member. Release means are provided on the base member operatively associated with the biasing means for deactivating the biasing means and allowing the IC card to be moved back to its preload position out of engagement with the latch means, whereby the cover and IC card can be pivoted back to an open position.

The connector further includes return means on the base member engageable with the IC card for sliding the IC card from its latched position back to its preload position automatically in response to the release means deactivating the biasing means. In the preferred embodiment, the return means comprises a spring-loaded arm located for engaging a leading edge of the IC card. The arm may be a metal member secured to and independent of the base member.

As disclosed herein, the latch means comprises a latch member engageable with a leading edge of the IC card. Like the return arm, the latch member may be a metal member independent of and secured to the base member.

The biasing means comprises a biasing shoulder on the base member in the path of movement and engageable with a trailing edge of the IC card as the cover and IC card are pivoted toward the base member. The biasing shoulder is formed on a yieldable arm portion of the base member. A push-button portion of the yieldable arm is engageable by an operator to move the yieldable arm and, thereby, to move the biasing shoulder out of engagement with the trailing edge of the IC card.

Other features of the invention include a stop shoulder on the base member defining the preload position of the IC card on the cover. In addition, complementary interengaging opening means are provided between the cover and the base member for automatically moving the cover away from the base member in response to disengagement of the latch means from the IC card. In the preferred embodiment, the opening means comprises a spring member on the cover engageable with the base member for spring loading the cover in its closed position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
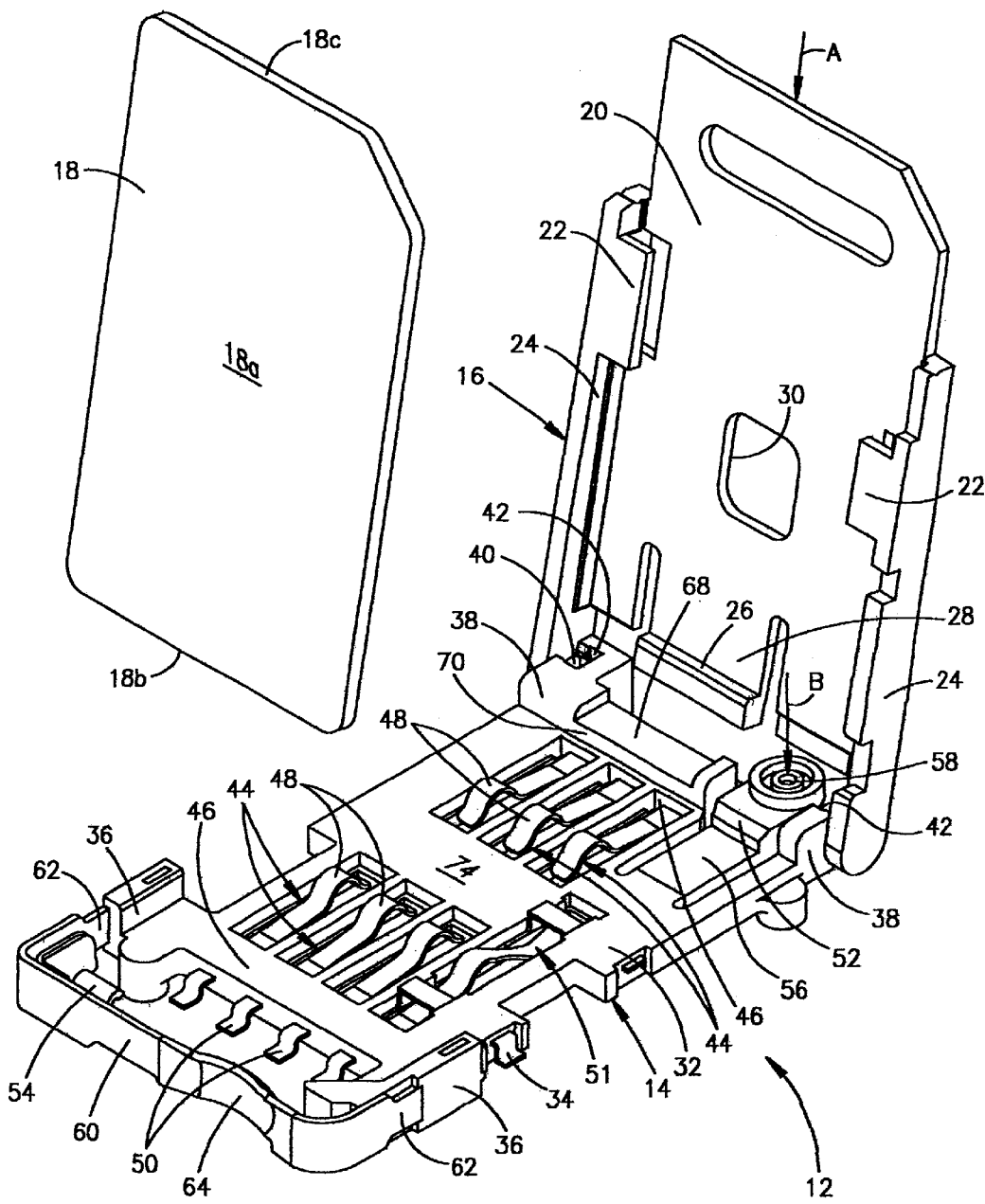
FIG. 1 is a perspective view of an IC card connector embodying the concepts of the invention, in open condition and in conjunction with an IC card.

Referring to the drawings in greater detail, and first to FIG. 1, the invention is embodied in an IC card connector, generally designated 12, which is extremely simple and includes two basic components, namely a base member, generally designated 14, and a cover, generally designated 16. An IC card 18 is inserted into cover 16 in the direction of arrow "A" until the card reaches a preload position shown in FIG. 2. The IC card is a miniature card of conventional or known construction and includes a terminal array (not shown) on a bottom side 18a of the card. In the preferred embodiment, the IC card is a SIM ("Subscriber Identification Module") card as is used in cellular phones for identification and storage of subscriber related data.

Figure 2:
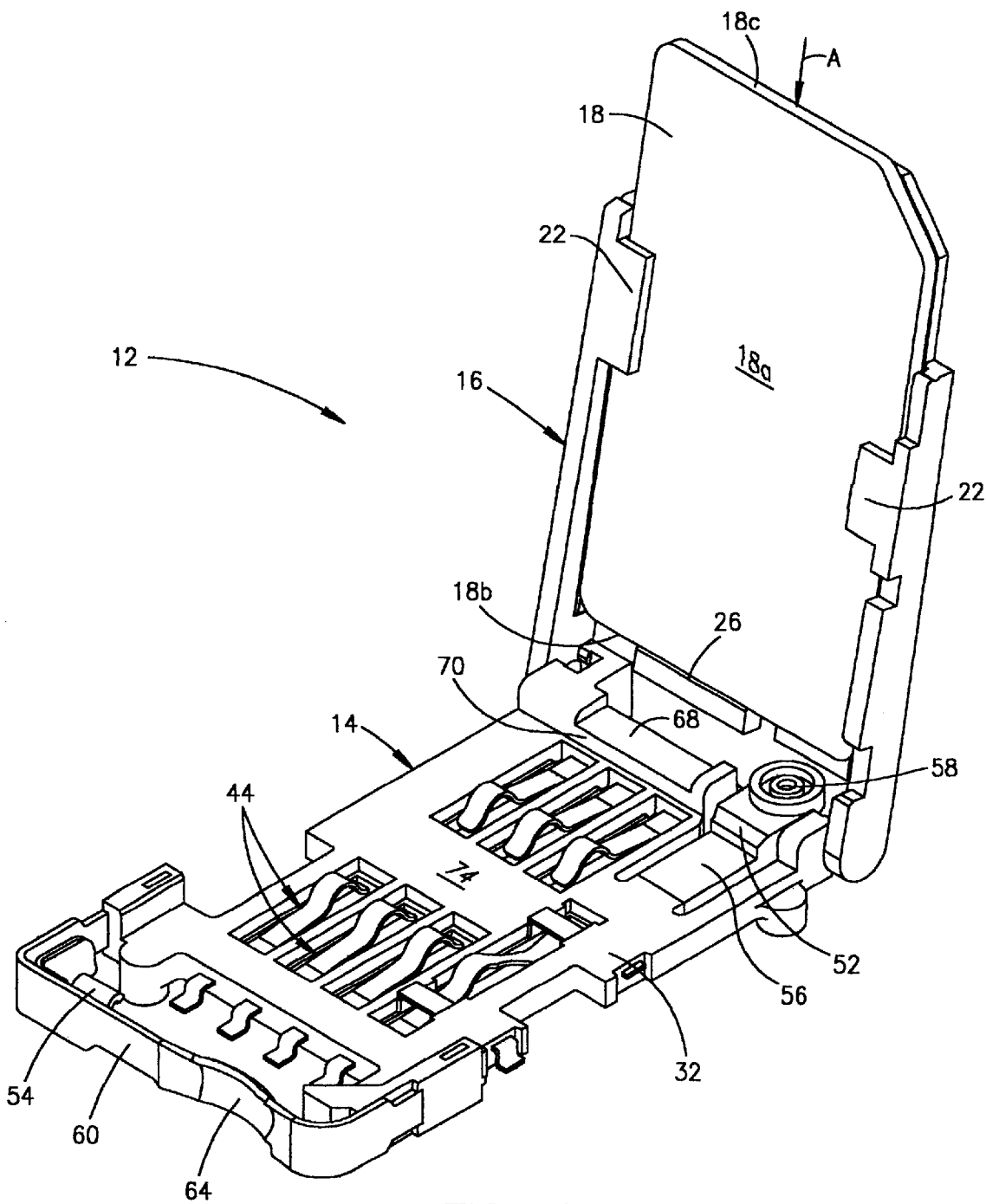
FIG. 2 is a view similar to that of FIG. 1, with the IC card inserted into the cover to a preload position.

Still referring to FIGS. 1 and 2, when IC card 18 is inserted into cover 16, the card slides between a top wall 20 of the cover and a pair of inwardly directed flanges 22 which project inwardly from a pair of side arms 24 of the cover. When the card reaches its preload position, an edge 18b of the card abuts a stop shoulder 26 of the cover. Stop shoulder 26 is formed on the inner side and at the end of a resilient arm 28 which forms a spring member for purposes described hereinafter. Therefore, top wall 20, flanges 22 and stop shoulder 26 define a receptacle means for securing IC card 18 on or within cover 16. Finally, a generally square access opening 30 is formed in top wall 20 of cover 16, for purposes described hereinafter. The entire cover is a one-piece structure unitarily molded of plastic material or the like.

Base member 14 of IC card connector 12 also may be molded of dielectric material such as plastic or the like and includes a generally flat base 32. The connector, particularly base 32 of base member 14, is adapted for mounting on a surface of a printed circuit board. The base has a pair of integral flanges 36 which project upwardly and outwardly at one end thereof and a pair of enlarged portions 38 at the opposite end thereof. Cover 16 is pivotally mounted to base member 14 by inwardly directed pivot trunions 40 snapped into recesses 42 in the top of enlarged portions 38. Base member 14 mounts a plurality of electrically conductive contacts, generally designated 44, in cross portions 46 of base 32. The preferred embodiment, shown in the figures, contemplates insert-molding the contacts in base 32, however, the invention contemplates other methods of assembly including stitching or gang-loading. The contacts have cantilevered spring arms terminating in contact portions 48 projecting upwardly from base 32 for engaging the terminal array of IC card 18. Contacts 44 have tail portions 50 for connection, as by soldering, to appropriate circuit traces on the printed circuit board. The connector may include a switch contact, generally designated 51, with a surface mount ground path return 34.

Generally, IC card 18 is mounted within cover 16 for sliding movement relative to the cover in a direction generally perpendicular to the axis of rotation of the cover, between a preload position shown in FIG. 2 to a latched position described hereinafter. Generally, biasing means are provided on base member 14 for sliding the IC card from its preload position to its latched position automatically in response to closing the cover 16 onto base member 14.

More particularly, the biasing means comprises a biasing shoulder 52 (FIGS. 1 and 2) which is in the path of movement of and engageable with edge 18b of the IC card as the cover and IC card are pivoted toward base member 14. Since the IC card is slidable from its preload position to a latched position opposite the direction of arrows "A" (FIGS. 1 and 2), edge 18b of the IC card will be considered the trailing edge of the card, and an opposite edge 18c will be considered the leading edge of the card. With that understanding, latch means in the form of a latch hook 54 is provided for engaging leading edge 18c of the card when the card is in its latched position.

Generally, release means are provided on base member 14 operatively associated with biasing shoulder 52 for deactivating the biasing shoulder and allowing the IC card to be moved back to its preload position out of engagement with latch hook 54, whereby cover 16 and the IC card can be pivoted back to the open position. More particularly, it can be seen clearly in FIGS. 1 and 2 that biasing shoulder 52 is formed on a resilient or yieldable arm 56 having a push-button 58 at a distal or rear end of the yieldable arm. Therefore, as will seen hereinafter, depression of push-button 58 in the direction of arrow "B" (FIGS. 1 and 2) will cause arm 56 to yield downwardly and move biasing shoulder 52 out of engagement with trailing edge 18b of the IC card.

Return means in the form of a generally U-shaped spring arm 60 is provided at the front of base member 14 for sliding the IC card from its latched position back to its preload position automatically in response to moving biasing shoulder 52 out of engagement with trailing edge 18b of the IC card. More particularly, U-shaped spring arm 60 may be fabricated of spring metal material and include side legs 62 insert-molded within flanges 36 of base 32 of the base member. Insert-molding side legs 62 within flanges 36 provides a reliable method for rigidly locking the spring arm to the base member. The spring arm has a bulging portion 64 which is engageable with leading edge 18c of the IC card, as will be seen hereinafter. Latch hook 54 may also be of metal material and fixed to the inside of metal spring arm 60. By fabricating the spring arm and the latch hook of metal material, greater wearing surfaces are provided than would be afforded by plastic material, although plastic and other materials are options.

Figure 3:
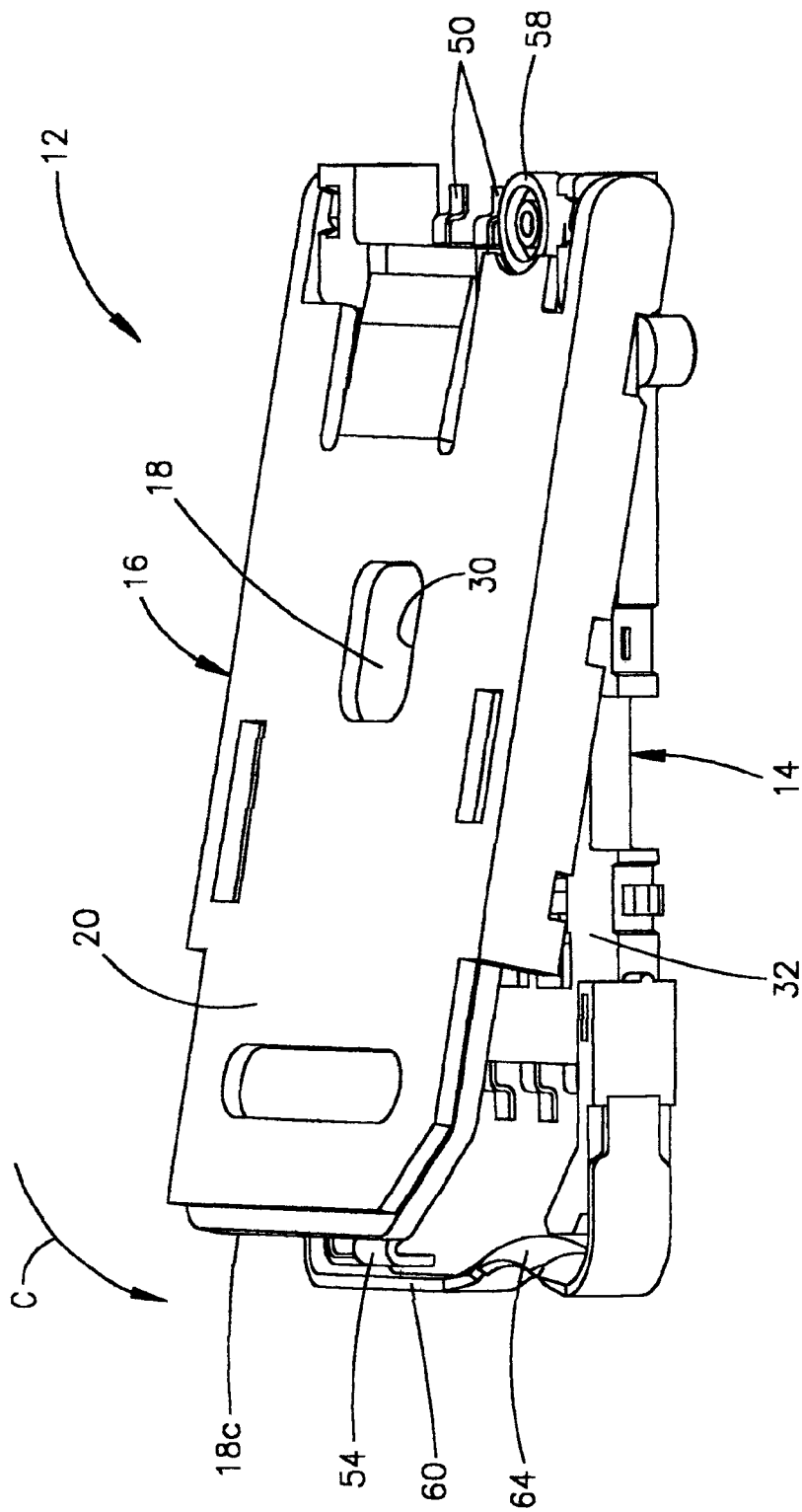
FIG. 3 is a perspective view of the connector with the cover and IC card partially closed.
Figure 4:
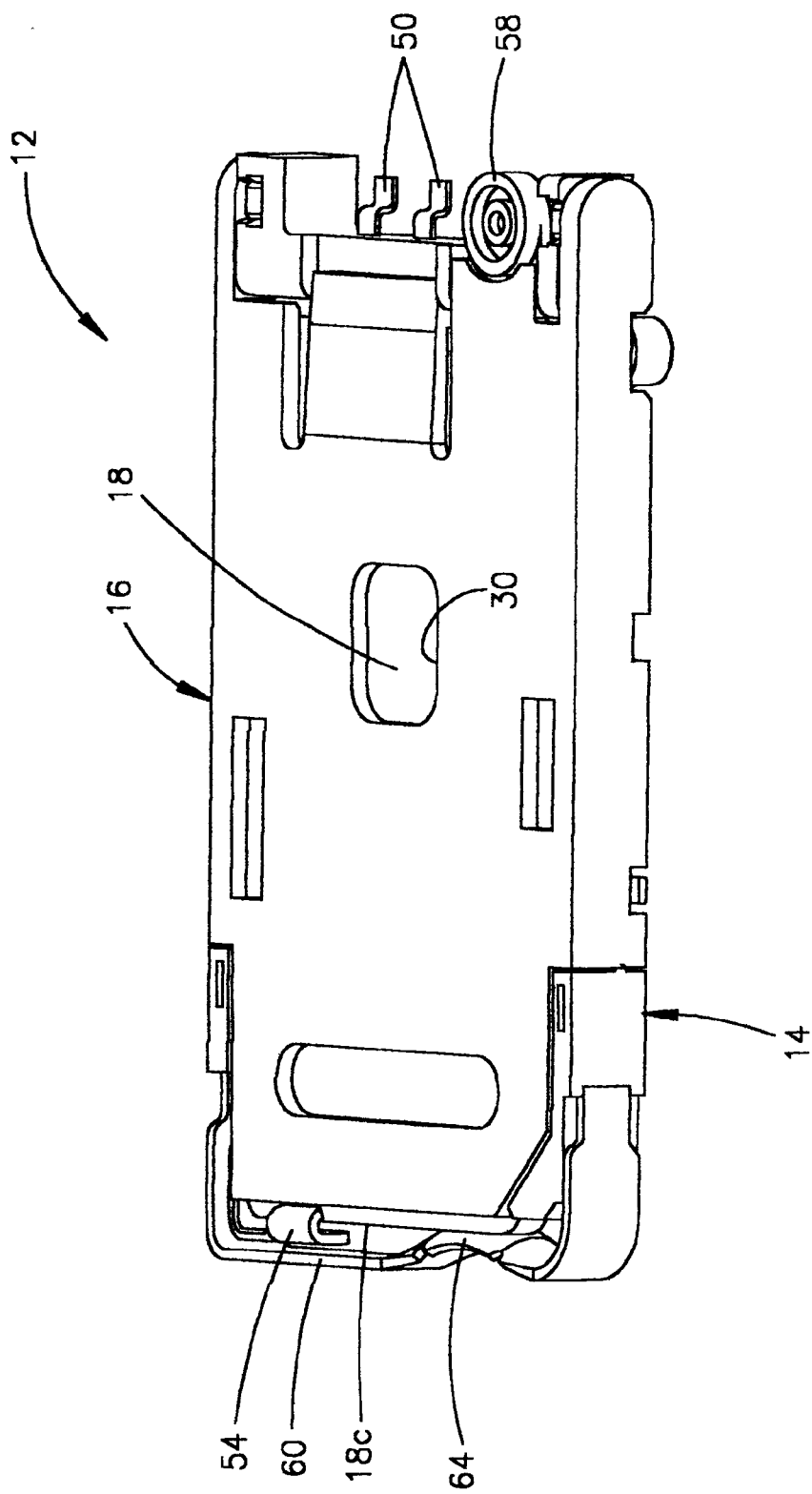
FIG. 4 is a view similar to that of FIG. 3, with the cover and IC card closed, and the IC card having been moved to its latched position.

The operation of IC card connector 12 now will be described. FIGS. 3 and 4 show cover 16 and an inserted IC card 18 being pivoted downwardly relative to base member 14 in the direction of arrow "C" (FIG. 3) to a latched position of the IC card shown in FIG. 4. During this movement from the open to the closed position of the cover, several events occur. First, trailing edge 18b of the IC card engages chamfered biasing shoulder 52 on base member 14 to slide the IC card forwardly form its preload position to its latched position. This is effective automatically in response to closing of the cover. In other words, trailing edge 18b of the IC card moves off of stop shoulder 26 (FIG. 1) inside cover 16, and leading edge 18c of the IC card moves under latch hook 54. Second, leading edge 18c of the card engages bulging portion 64 of spring arm 60 to cock or spring-load the arm. The latched position of the card is shown clearly in FIG. 7. It can be seen that trailing edge 18b of the card is in engagement with biasing shoulder 52, leading edge 18c of the card is in engagement with bulging portion 64 of spring arm 60 and the leading edge also is latched under latch hook 54.

Figure 5:
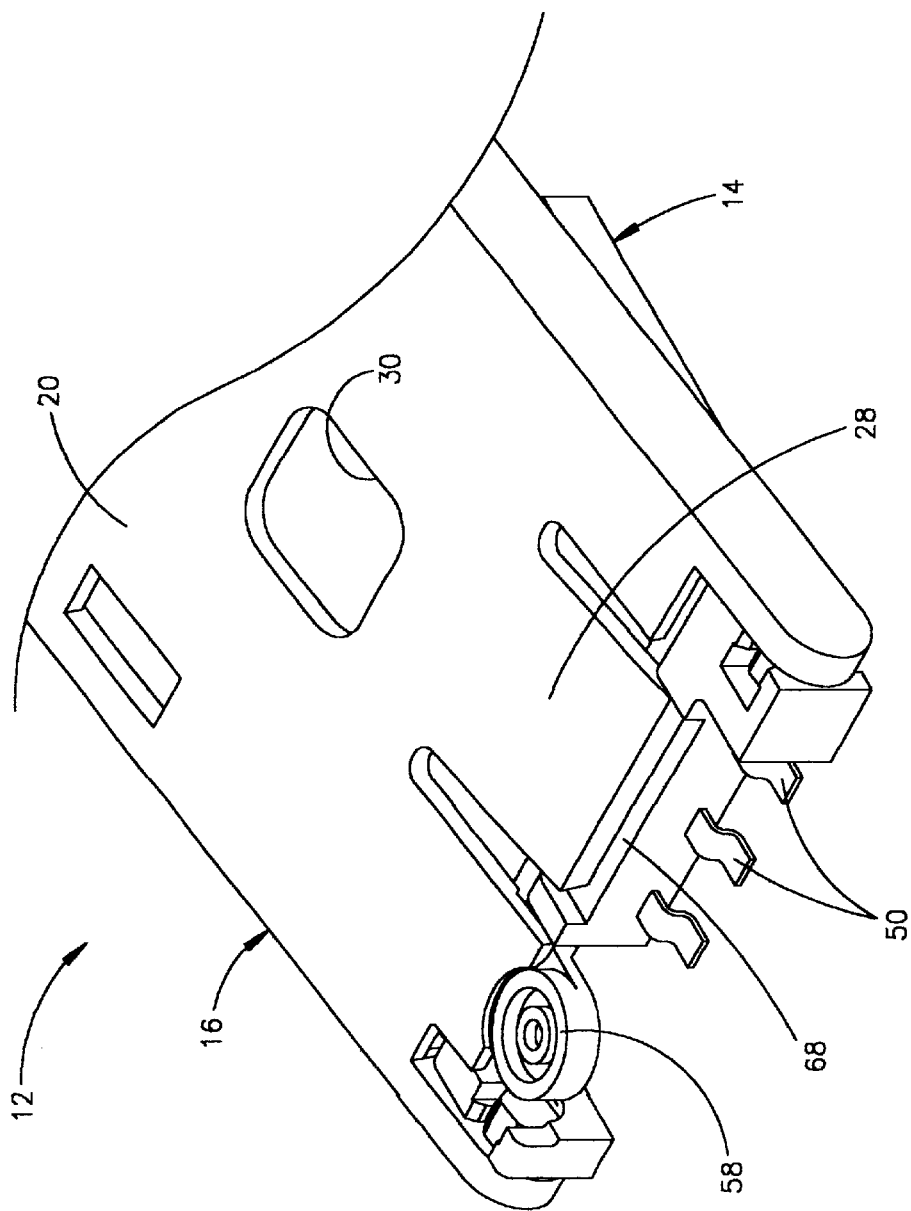
FIG. 5 is a fragmented perspective view of the rear of the connector, with the cover in partially open position.
Figure 6:
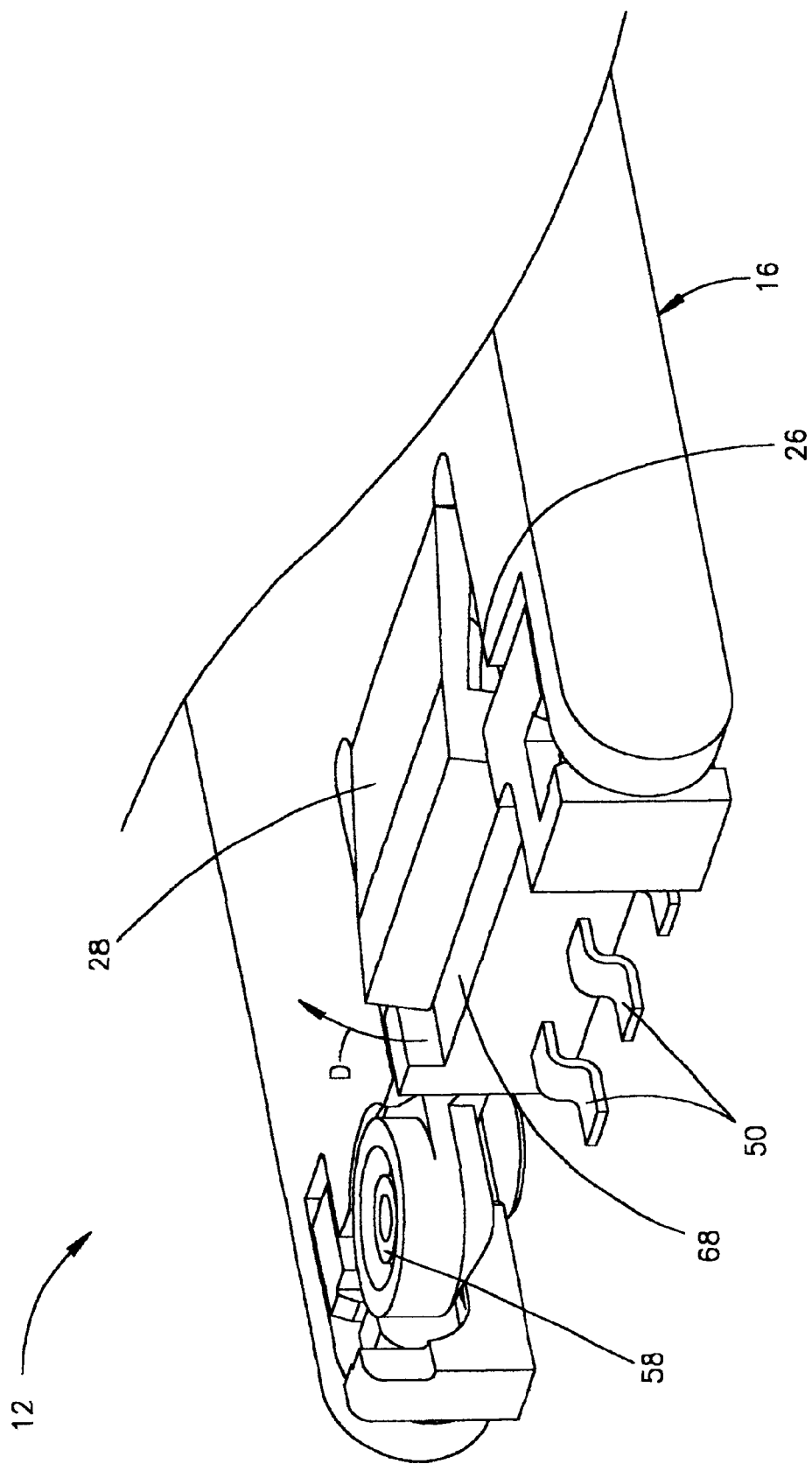
FIG. 6 is a view similar to that of FIG. 5, with the cover closed and the spring-loaded opening means in cocked condition.

A third occurrence upon closing of the cover onto the base member is shown best in FIGS. 5 and 6. Specifically, when the cover closes, stop shoulder 26 (FIG. 1) on the cover engages an elevated platform 68 on the base member and biases resilient arm 28 upwardly in the direction of arrow "D" (FIG. 6). In essence, this action cocks or spring-loads resilient arm 28 so that it now becomes a spring member when the cover is closed.

Figure 7:
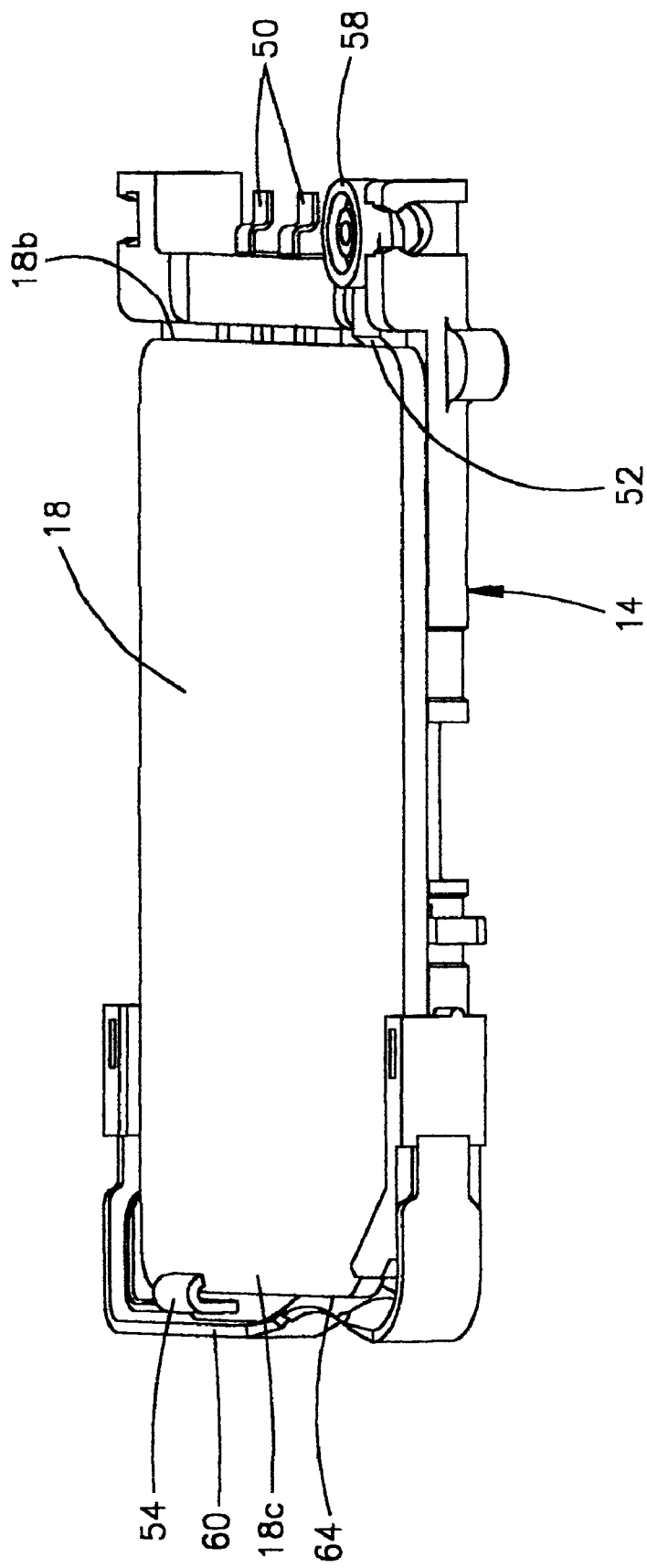
FIG. 7 is a perspective view of the connector with the cover removed to show the IC card within the base member in its latched position.
Figure 8:
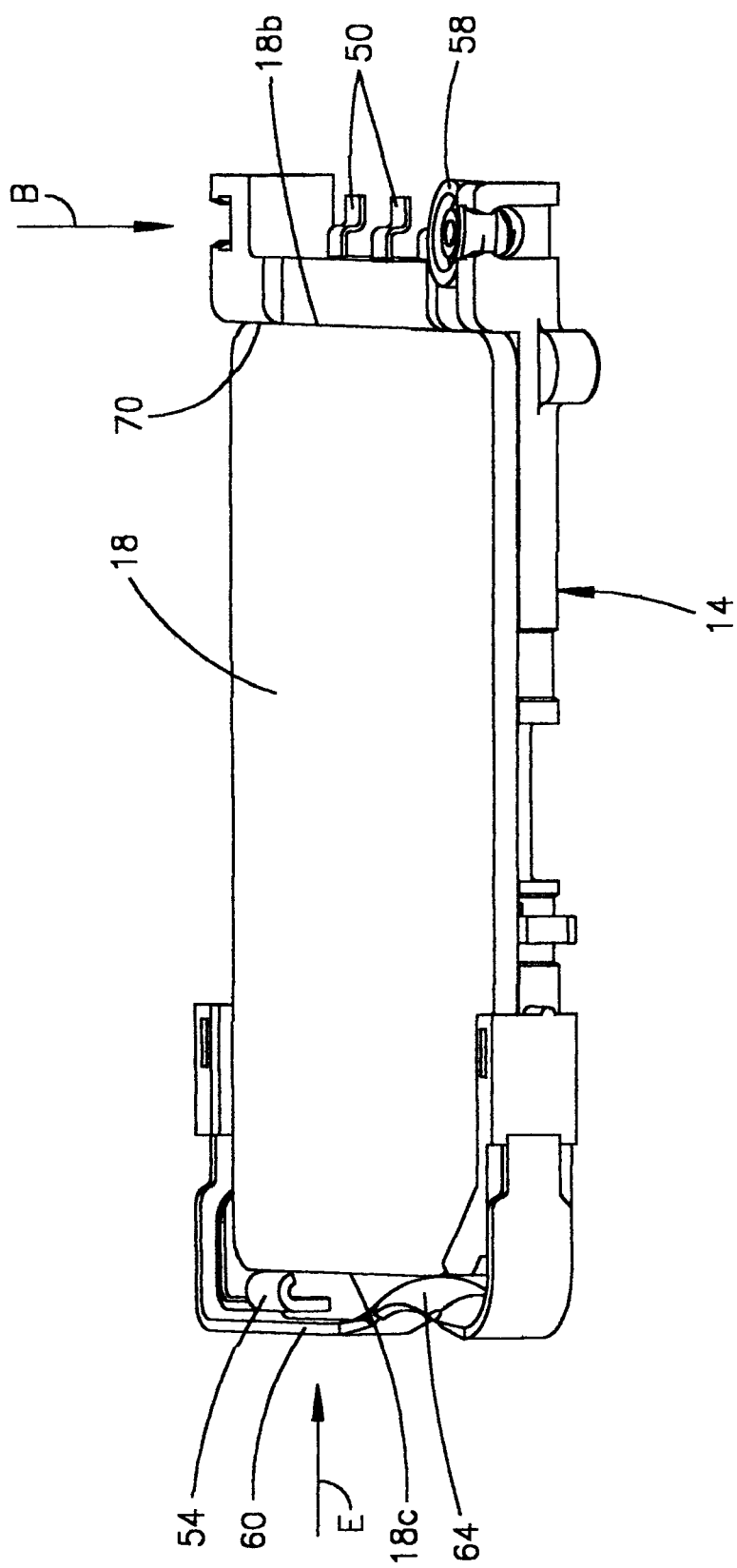
FIG. 8 is a view similar to that of FIG. 7, with the push-button and release arm depressed so that the IC card has moved back to its preload position.

When it is desired to open cover 16 from base member 14, such as for removal of IC card 18, reference is made to FIGS. 7 and 8. As stated above, FIG. 7 shows IC card in its fully latched or operative position. When it is desired to open the cover and the IC card, an operator depresses push-button 58 in the direction of arrow "B" (FIG. 8) which moves biasing shoulder 52 (FIG. 7) out of engagement with trailing edge 18b of the IC card. This allows spring arm 60, with bulging portion 64 thereof engaging leading edge 18c of the card, to move the card rearwardly in the direction of arrow "E" out of latching engagement beneath latch hook 54. Rearward movement of the card is arrested by a stop shoulder 70 of base member 14.

When the leading edge 18c of IC card 18 is free of latch hook 54 as shown in FIG. 8, cocked resilient arm 28, as seen and described above in relation to FIG. 6, now acts as a spring member to automatically open the cover at least to the partially opened position shown in FIG. 3. In other words, the cover and IC card move toward the open position automatically in response to depressing push-button 58.

Figure 9:
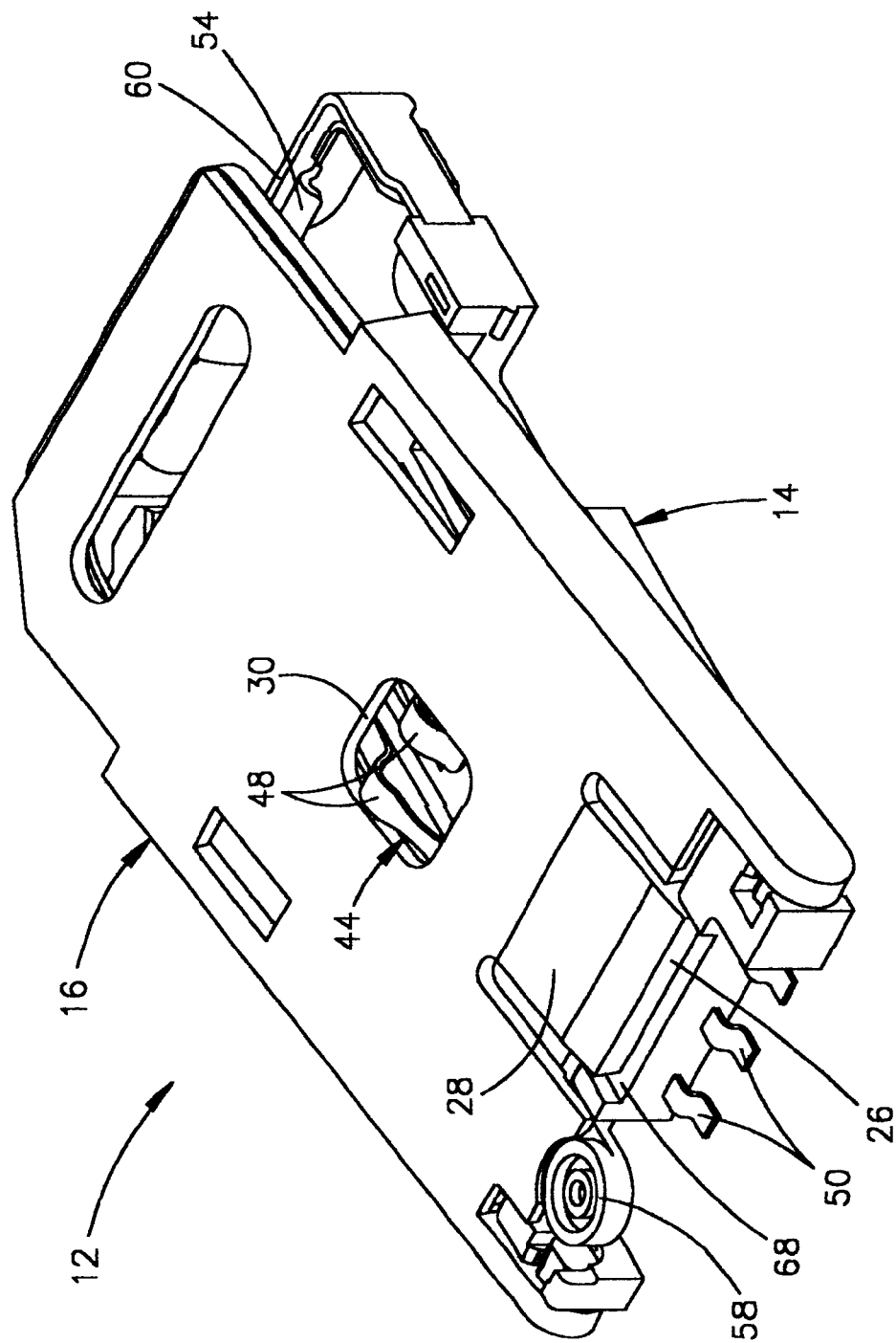
FIG. 9 is a rear perspective view of the connector in its partially open position and with the IC card removed to show the access opening in the cover.
Figure 10:
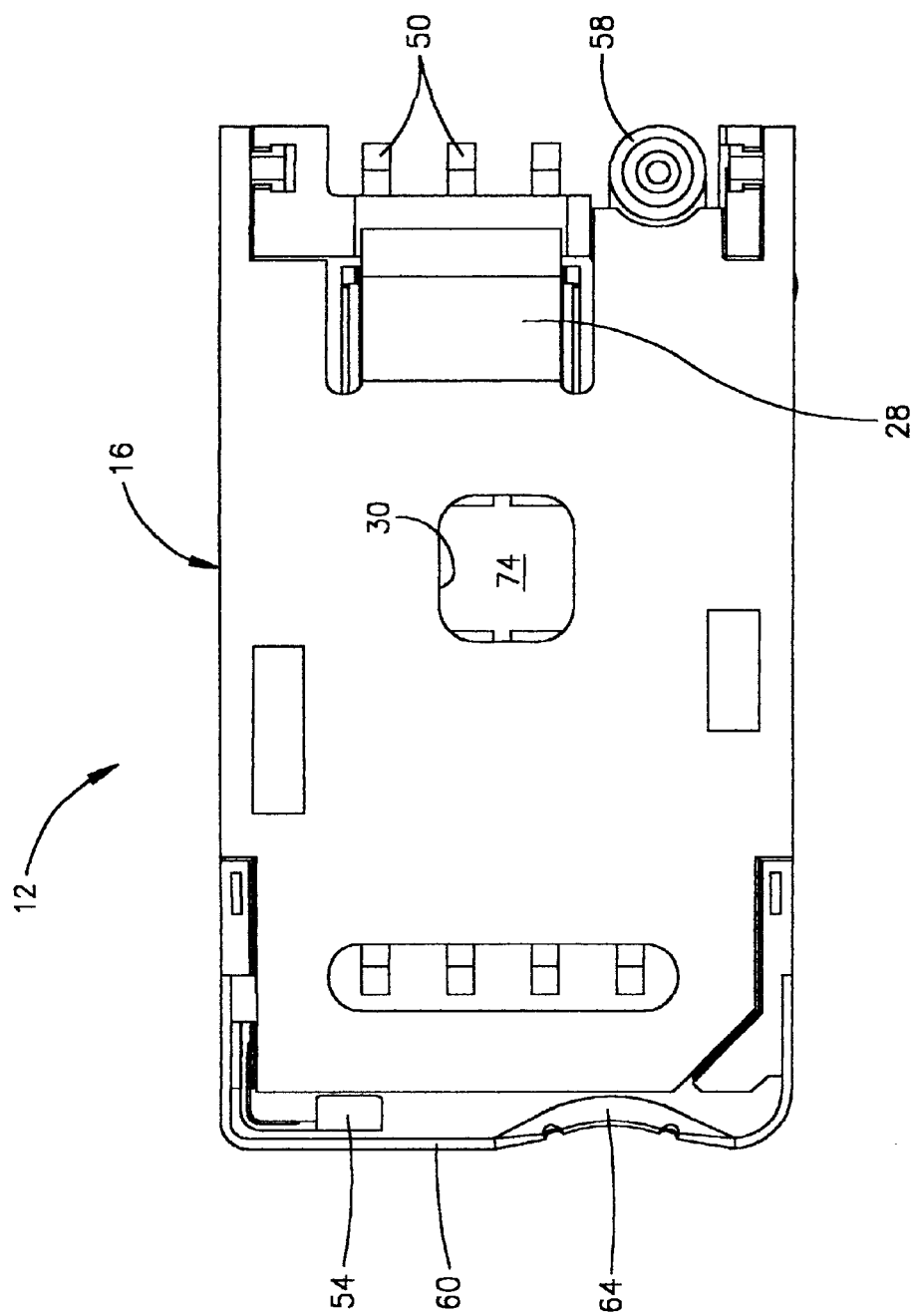
FIG. 10 is a top plan view of the connector in the condition of FIG. 9, to show the alignment of the access opening in the cover and the flat surface area of the base member.
Figure 11:
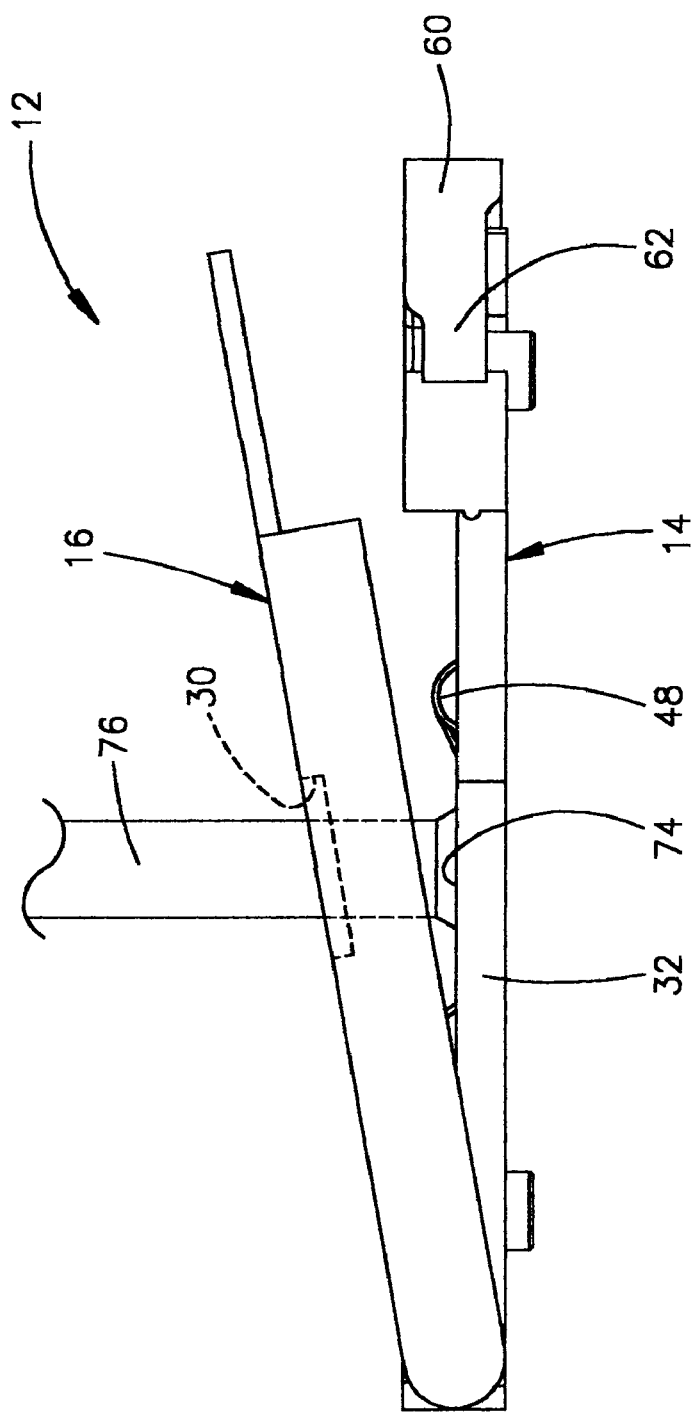
FIG. 11 is a side elevational view of the connector in the condition of FIG. 9 to show a vacuum-suction nozzle extending through the access opening in the cover into engagement with the flat surface area on the base member.

FIGS. 9–11 show a feature of the invention which facilitates manipulation of IC card connector 12 by a vacuum-suction nozzle. In particular, vacuum transfer and placement mechanisms are widely used for moving connectors from a supply source and transferring them by applying negative air pressure to the connectors and placing them onto a printed circuit board in a preselected position for soldering, as with connectors such as IC connector 12. Using cover 16 as a top surface for engagement by the vacuum-suction nozzle often is not acceptable. For instance, in IC card connector 12, cover 16 is designed to remain partially open as a visual indication that the cover is not locked and/or that IC card 18 is not present in the connector. In this partially open position, the cover is pivoted open approximately 10° from base 32 as shown in FIGS. 9 and 11.

In order to provide for manipulation by a vacuum-suction nozzle, access opening 30 in cover 16 is aligned with an upper surface area 74 on top of base 32 (FIG. 1) of base member 14. Surface area 74 is of a size sufficient for engagement by the vacuum-suction nozzle. As seen in FIG. 11, such a vacuum-suction nozzle 76 is inserted through access opening 30 and into engagement with upper surface area 74 of base 32 of base member 14. This is accomplished notwithstanding the fact that cover 16 is in a partially open position relative to the base member.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An IC card connector for connecting an IC card having a terminal array, comprising:
    a base member including a plurality of electrically conductive contacts exposed at least one side thereof for engaging the terminal array of the IC card;
    a cover mounted on the base member for pivotal movement about an axis of rotation toward and away from said one side of the base member, the cover having receptacle means for securing the IC card thereon whereby closing of the cover onto the base member effects engagement of the IC card terminal array with the contacts on the base member, the IC card being received for sliding movement relative to the cover in a direction generally perpendicular to the axis of rotation between a preload position and a latched position;
    biasing means on the base member for sliding the IC card from its preload position to its latched position in response to closing of the cover;
    latch means on the base member for engaging the IC card in its latched position to lock the cover and IC card in a closed position on the base member; and
    release means on the base member operatively associated with said biasing means for deactivating the biasing means and allowing the IC card to be moved back to its preload position out of engagement with said latch means whereby the cover and IC card can be pivoted back to an open position.

2. The IC card connector of claim 1, including return means on the base member engageable with the IC card for sliding the IC card from its latched position back to its preload position in response to said release means deactivating the biasing means.

3. The IC card connector of claim 2 wherein said return means is located for engaging a leading edge of the IC card.

4. The IC card connector of claim 3 wherein said return means comprises a spring arm.

5. The IC card connector of claim 4 wherein said spring arm is a metal member secured to a leading edge of the base member.

6. The IC card connector of claim 1 wherein said latch means comprises a latch member engageable with a leading edge of the IC card.

7. The IC card connector of claim 6 wherein said latch member is a metal member secured to the base member.

8. The IC card connector of claim 1 wherein said biasing means comprises a biasing shoulder on the base member engageable with a trailing edge of the IC card as the cover and IC card are pivoted toward the base member.

9. The IC card connector of claim 8 wherein said biasing shoulder is formed on a yieldable arm portion of the base member, said release means being effective to move the yieldable arm portion and, thereby, to move the biasing shoulder out of engagement with the trailing edge of the IC card.

10. The IC card connector of claim 9 wherein said yieldable arm portion includes a push-button portion for engagement by an operator to move the arm portion.

11. The IC card connector of claim 1, including stop shoulder means on the base member defining the preload position of the IC card on the cover.

12. The IC card connector of claim 1, including complementary interengaging opening means between the cover and the base member for moving the cover away from the base member in response to disengagement of the latch means from the IC card.

13. The IC card connector of claim 12 wherein said opening means comprises a spring member on the cover engageable with the base member for spring loading cover in its closed position.

14. The IC card connector of claim 13 wherein said spring member comprises a spring arm integral with the cover.

15. An IC card connector for connecting an IC card having a terminal array, comprising:

a base member including a plurality of electrically conductive contacts exposed at least one side thereof for engaging the terminal array of the IC card;

a cover mounted on the base member for pivotal movement about an axis of rotation toward and away from said one side of the base member, the cover having receptacle means for securing the IC card thereon whereby closing of the cover onto the base member effects engagement of the IC card terminal array with the contacts on the base member, the IC card being received for sliding movement relative to the cover in a direction generally perpendicular to the axis of rotation between a preload position and a latched position, the IC card thereby having a leading edge and a trailing edge in said direction of sliding movement;

a biasing shoulder on the base member in the path of movement of and engageable with said trailing edge of the IC card are pivoted toward the base member, for sliding the IC card from its preload position to its latched position in response to closing of the cover;

a latch member on the base member for engaging the leading edge of the IC card in its latched position to lock the cover and IC card in a closed position on the base member;

release means on the base member for moving the biasing shoulder out of engagement with the trailing edge of the IC card to allow the IC card to be moved back to its preload position out of engagement with the latch member; and return means on a leading edge of the base member engageable with the leading edge of the IC card for sliding the IC card from its latched position back to its preload position in response to the biasing shoulder being moved out of engagement with the trailing edge of the IC card.

16. The IC card connector of claim 15 wherein said return means comprises a spring arm.

17. The IC card connector of claim 16 wherein said spring arm is a metal member secured to the base member.

18. The IC card connector of claim 15 wherein said latch member is a metal member secured to a leading edge of the base member.

19. The IC card connector of claim 15 wherein said biasing shoulder is formed on a yieldable arm portion of the base member, said release means being effective to move the yieldable arm portion and, thereby, to move the biasing shoulder out of engagement with the trailing edge of the IC card.

20. The IC card connector of claim 19 wherein said yieldable arm portion includes a unitary push-button portion for engagement by an operator to move the arm portion.

21. The IC card connector of claim 15, including stop shoulder means on the base member defining the preload position of the IC card on the cover.

22. The IC card connector of claim 15, including complementary interengaging opening means between the cover and the base member for moving the cover away from the base member in response to disengagement of the latch means from the IC card.

23. The IC card connector of claim 22 wherein said opening means comprises a spring member on the cover engageable with the base member for spring loading cover in its closed position.

24. The IC card connector of claim 23 wherein said spring member comprises a spring arm unitarily formed with the cover.

* * * * *